(12) United States Patent
Ozbutun

(10) Patent No.: US 6,658,405 B1
(45) Date of Patent: Dec. 2, 2003

(54) INDEXING KEY RANGES

(75) Inventor: Cetin Ozbutun, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/478,945

(22) Filed: Jan. 6, 2000

(51) Int. Cl.⁷ ............................................. G06F 17/30
(52) U.S. Cl. ........................ 707/3; 707/2; 707/102; 707/104.1
(58) Field of Search ............................ 707/1–10

(56) References Cited

U.S. PATENT DOCUMENTS

| | | | | |
|---|---|---|---|---|
| 4,774,657 A | * | 9/1988 | Anderson et al. ............ | 707/2 |
| 4,956,774 A | * | 9/1990 | Shibamiya et al. ........... | 707/2 |
| 5,319,779 A | * | 6/1994 | Chang et al. .................. | 707/3 |
| 5,560,007 A | * | 9/1996 | Thai .............................. | 707/3 |
| 5,727,197 A | * | 3/1998 | Burgess et al. ............... | 707/2 |
| 5,761,652 A | * | 6/1998 | Wu et al. ...................... | 707/2 |
| 5,899,988 A | * | 5/1999 | Depledge et al. ............. | 707/3 |
| 5,918,225 A | * | 6/1999 | White et al. .................. | 707/3 |
| 5,924,088 A | * | 7/1999 | Jakobsson et al. ............ | 707/3 |
| 6,006,219 A | * | 12/1999 | Rothschild .................... | 707/3 |
| 6,009,425 A | * | 12/1999 | Mohan ........................... | 707/8 |
| 6,026,398 A | * | 2/2000 | Brown et al. .................. | 707/5 |
| 6,067,540 A | * | 5/2000 | Ozbutun et al. ............... | 707/3 |
| 6,141,656 A | * | 10/2000 | Ozbutun et al. ............... | 707/3 |
| 6,144,957 A | * | 11/2000 | Cohen et al. .................. | 707/3 |
| 6,195,656 B1 | * | 2/2001 | Ozbutun et al. ............... | 707/3 |
| 6,266,662 B1 | * | 7/2001 | Ozbutun et al. ............... | 707/3 |

* cited by examiner

*Primary Examiner*—Shahid Al Alam
*Assistant Examiner*—Anh Ly
(74) *Attorney, Agent, or Firm*—Marcel K. Bingham; Hickman Palermo Truong & Becker LLP

(57) ABSTRACT

A method and mechanism is described for indexing a body of records. An index associates ranges with records that hold key field values that fall within those ranges. Such an index may be implemented as a bitmap index. The bitmap index may contain entries that associate a range with a bitmap. The bitmap of an index entry identifies which records have a key field value that falls within the range associated with the entry. The index may be a native index maintained by a database system. The database system uses the index to efficiently process queries that specify range criteria.

20 Claims, 2 Drawing Sheets

INDEXING KEY RANGES

FIELD OF THE INVENTION

The present invention relates to technique for indexing data in a database system.

BACKGROUND OF THE INVENTION

In typical database systems, users store, update, and retrieve information by interacting with the database system by submitting commands to a database system. The database system responds to the commands by performing the specified actions on the database managed by the database system. To be correctly processed, the commands must comply with the database language that is supported by the database server. One popular database language is known as Structured Query Language (SQL).

To retrieve data from the database server, users typically submit queries that conform to the database language. To retrieve data that satisfies criteria, users submit queries that specify the retrieval criteria. Retrieval criteria is criteria that the data to be retrieved must satisfy. In response to receiving a query that specifies retrieval criteria, a database system may use an index to retrieve the requested data more efficiently.

A typical index associates values from a field with records that contain those values for the field. The field is referred to as the key field. Values in the key field are referred to as "key values", or simply as "keys". An entry in a typical index is in the form <key, record id>.

A record id is data that identifies a record, such as a row in a relational database table. For a particular entry in the index, the record identified by the record id within the entry has a key value that matches the key value specified in the index entry. An index that contains entries that each associate a key with a single record is herein referred to as a one-to-one index.

An index is referred to as an "equality index" if the entries of the index associate keys to one or more records that contain key values that match the key values specified in the index entries. An equality index is useful for more efficiently executing queries that specify criteria based on equality, that is, criteria which require that all retrieved records have a field set to a value equal to a specified value. The database system examines the index, scanning the entries to locate those that have keys equal to the specified value to determine what records to retrieve. The database system then retrieves those records identified by the entries that have keys equal to the specified value.

Another type of an index is a bitmap index. An index entry in a bitmap index may have the form: <key, bitmap>.

An entry in a bitmap index may associate a key with multiple records. The records to which the key of an entry is associated are identified by the bitmap in the entry. Specifically, a bitmap is a sequence of bits, where each bit in the sequence has a bit position, and where each bit position corresponds to a record. The bitmap indicates that a record is associated with the index key when the bit at the bit position in a bitmap that corresponds to the record is set to particular value, e.g. 0 or 1, or ON or OFF.

Bitmap indexes may be advantageously used for indexing fields that contain low cardinality data. Low cardinality data is data that includes a relatively low number of distinct values. On other hand, high cardinality data is data that includes a relatively high number of distinct values. For example, in a database system for a payroll system used to manage thousands of employees, a field may contain data representing a state (e.g. California). Such a field may have up to 50 distinct values, while a field that represents the salary of an employee may have many more unique values.

Bitmap entries typically contain one entry for each distinct value in the key field. For a particular set of records, a bitmap index of a field that contains low cardinality data has far fewer entries than a one-to-one index. For a field that contains high cardinality data on the other hand, the difference in the number of entries in a bitmap index and a one-to-one index is much smaller. Furthermore, using bitmap indexes to index high cardinality data creates many entries that have just a few bits set to identify records.

Not all queries specify equality-based criteria. Rather, a query may specify that the data to be retrieved satisfy criteria based on a range of values ("range criteria"). For example, a query may request records with a value in the salary field that falls between one thousand and two thousand dollars.

An equality based index of the salary field can be used to retrieve records for a query that specifies a salary range. Under these circumstances, the database system scans the entries that correspond to all keys that fall within the range. Thus, when a query specifies range criteria, scanning an equality index to determine what records need to be retrieved generally involves scanning more entries than are scanned when the query specifies equality based retrieval criteria.

Furthermore, queries that specify range criteria often specify range criteria that limits values in fields that contain high cardinality data. For example, a query may specify range criteria that limits values in a field that contains a numeric value used to represent a salary. Thus, fields used for range criteria are not amenable to bitmap indexes.

Based on the foregoing, it clearly desirable to provide an index that may be scanned to determine what records satisfy range-based retrieval criteria, and that allows queries that specify such criteria to be processed without scanning as many entries as would have to be scanned using equality indexes.

SUMMARY OF THE INVENTION

A method and mechanism is described for indexing a body of records. An index associates ranges with records that hold key field values that fall within those ranges. Such an index may be implemented as a bitmap index. The bitmap index may contain entries that associate a range with a bitmap. The bitmap of an index entry identifies which records have a key field value that falls within the range associated with the entry. The index may be a native index maintained by a database system. The database system uses the index to efficiently process queries that specify range criteria.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for indexing a body of records is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

According to an embodiment of the present invention, ranges are indexed to records that hold key field values that fall within the ranges. The key field upon which a range index is based is referred to as a range key field. A range index may be a bitmap index ("range bitmap index"), where each index entry has the form of <Beginning Key, End Key, R_bitmap>

The Beginning Key is a value that represents the beginning of a range. End Key is a value representing the end of the range. R_bitmap is a bitmap that indicates which records of a set of records have a key field value that falls within the range.

Figure 1:
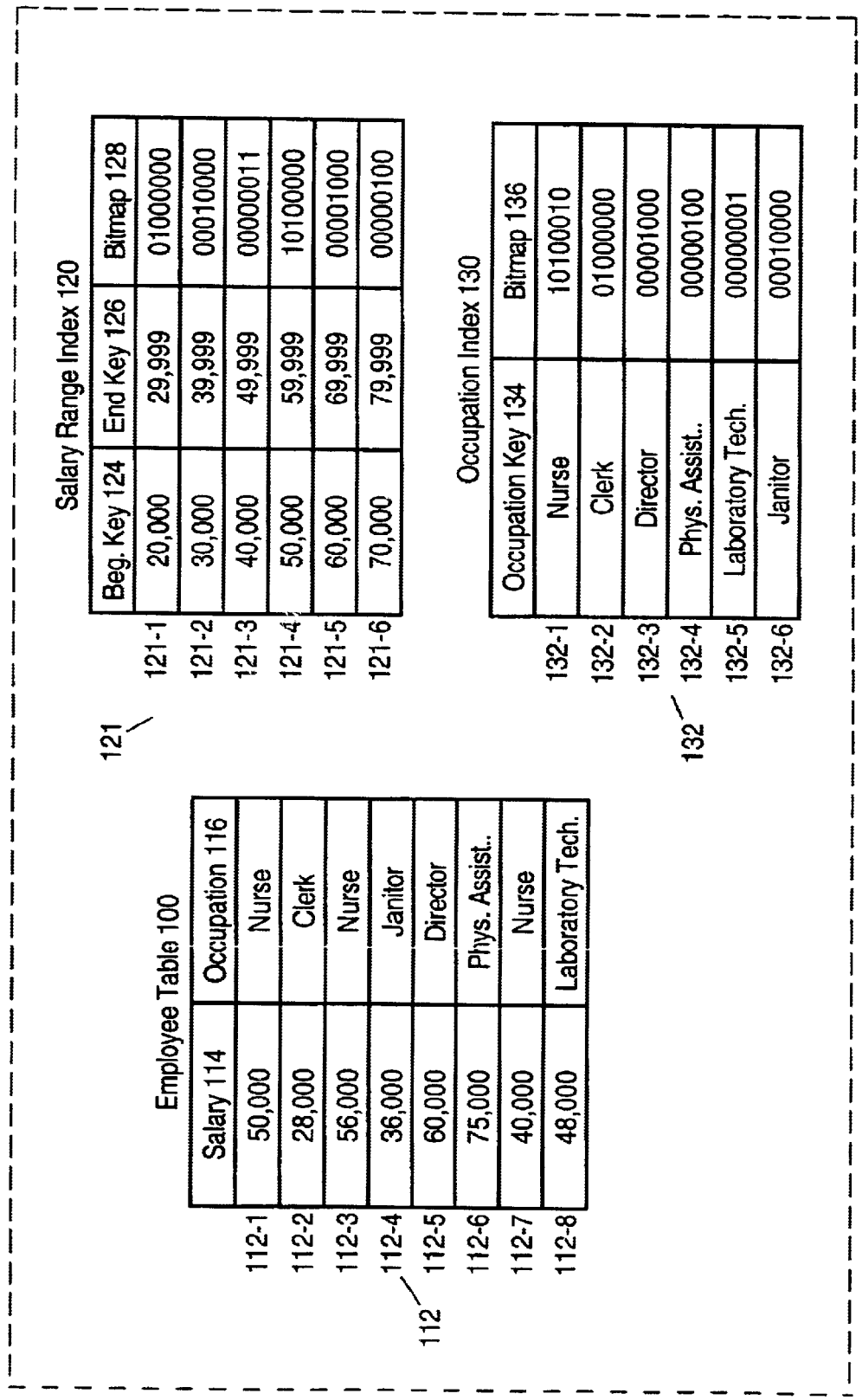
FIG. 1 is block depicting a database system with an exemplary range index according to an embodiment of the present invention.

FIG. 1 is a block diagram that illustrates a range index used in a database system. Referring to FIG. 1, database system 100 includes employee e table 110, occupation index 130, and salary range index 120. Employee table 110 is a table with rows 112 and columns: salary 114 and occupation 116 (not all columns of employee table 110 are shown).

Occupation index 130 is a conventional bitmap index. Occupation index 130 contains entries 132. Each of entries 132 has two elements: occupation key 134, and bitmap element 128. Each of index entries 132 associates a key in occupation key element 134 to the rows 112 within employee table 100 that have an occupation 116 column value that matches the key value of the index entry.

Salary Range Index 120 is a range bitmap index. Salary Range Index 120 contains entries 121. Each of entries 121 has three elements: beg. key 124, end key 126, and bitmap element 128. Each of index entries 121 associates a range to the rows 112 within employee table 100 that have a salary 114 column value that falls within the range. The bitmap element 128 for a each entry 121 indicates what records from employee table 110 have a salary 114 value that falls within the range that is associated with the entry. The beginning and end of the range associated with each salary range index entry 121 are specified by beg. key 124 and end key 126 within the entry.

For example, bitmap element 128 for entry 121-3 has the seventh and eighth bit positions set. These bit positions correspond to rows 112-7 and 112-8. For these entries, the salary 114 value falls with the range specified by beg. key 124 and end key 126 for entry 121-4, which is 50000 through 59999.

Salary range index 120 may be a native index, or an extensible index managed by database system 100. An extensible index is an index managed by a database system using methods (e.g. routines) supplied by a user. When database system 100 receives commands that specify update, insert, or delete operations, database system 100 modifies Salary Range Index 120 accordingly.

For example, database system 100 receives a request to insert a row into employee table 100. After inserting the record into employee table 110, database system 100 determines what range corresponds to the salary 114 value of the inserted record. The database system 100 modifies the entry in salary range index 120 that corresponds to the range, and modifies the bitmap element 128 of the entry to identify the inserted record. Database system 100 may also receive a request to update the salary 114 value of a row. In this case, database system 100 determines what range corresponds to the new salary 114 value of the inserted record. If the range is not the range that corresponded to the old salary value 114, then database system 100 modifies the entry in salary range index 120 that corresponds to the range of the old salary 114 value, modifying the bitmap element 128 of the entry to not identify the inserted record. Then database system 100 modifies the entry in salary range index 120 that corresponds to the range of the new salary 114 value in a manner similar to that performed for inserting a record.

A range index, such as salary range index 120, may be created in response to data definition commands issued by a user. An example of such commands are commands that conform to Data Definition Language commands in SQL.

Occupation index 130 is a bitmap index that indexes occupation field 116. Occupation index 130 contains index entries 132, each of which contain an element occupation key 134 and bitmap 136. An index entry 132 associates a key in occupation key element 134 to rows 112 with an occupation 116 value equal to the key.

Use of a range index enables a database to process queries that specify range criteria more efficiently. For a particular range key field, a range index will have fewer entries than an equality index. Consequently, less entries have to be scanned to determine what records satisfy the criteria. For example, a query EX1 requests retrieval of records from employee table 110, specifying range criteria that requires that the salary 114 column have a value between 40,000–49,999. For purposes of illustration, employee table 110 contains 100 records that have a salary 114 value within the specified range criteria. An equality index would have 100 index entries, while a range bitmap index would have far fewer, depending on specific ranges covered by various range bitmap index entries. The difference, in the number entries that satisfy a specified range criteria, between an equality index and range bitmap index is greater for high cardinality data than for low cardinality data.

A query may specify range criteria for ranges whose ending or beginning values do not coincide with the range of an index. For example, a query may specify range criteria that requires a record to contain a salary 114 value between 25000 and 35000. In this case, a database system may scan entries associated with more than one pair of a beg. key and an end key, but the number index entries scanned may still be less than would be scanned if using an equality index.

In addition to range criteria, a query can specify other criteria. A range bitmap index may be used to determine what records satisfy the range criteria, while a conventional bitmap index may indicate what records satisfy the other criteria. A database system may combine bitmaps from both the range bitmap index and the other bitmap index to determine what records satisfy both the range criteria and the other criteria. The term combine refers to logical operations, such as ANDing and ORing. For example, a query may request rows from the employee table 110, where the salary is between 30000 and 49999 and the occupation 116 value equals 'Nurse'. The database system may perform an OR operation between the bitmap elements 128 of entries 121-2 and 121-3, and with this result perform an AND operation with the bitmap element 136 of entry 132-1.

Bitmaps may be used to represent the intermediate results of operations performed to determine what records satisfy some of the criteria specified by a query. For example, a query may request rows from the employee table 110, where the salary is between 30000 and 49999 and the occupation 116 equals 'Nurse' or 'Lab Technician'. The database system may first scan occupation index 130 to determine what records satisfy the criteria regarding occupation 116, and generate intermediate result in the form of a bitmap that specifies what records satisfy the criteria. This bitmap may then be combined with a bitmap from a range index.

While the present invention has been illustrated using range indexes that are bitmaps, other types of indexes may be used for range indexes. For example, range indexes may be implemented as indexes that have the form <Beg. Key, End Key, row_id1, row_id2, . . . >, where each row_id identifies a row that includes a key value that falls within the range defined by the begin and end key values of the index entry. Therefore, it is understood that the present invention is not limited to any particular form of an index.

HARDWARE

Figure 2:
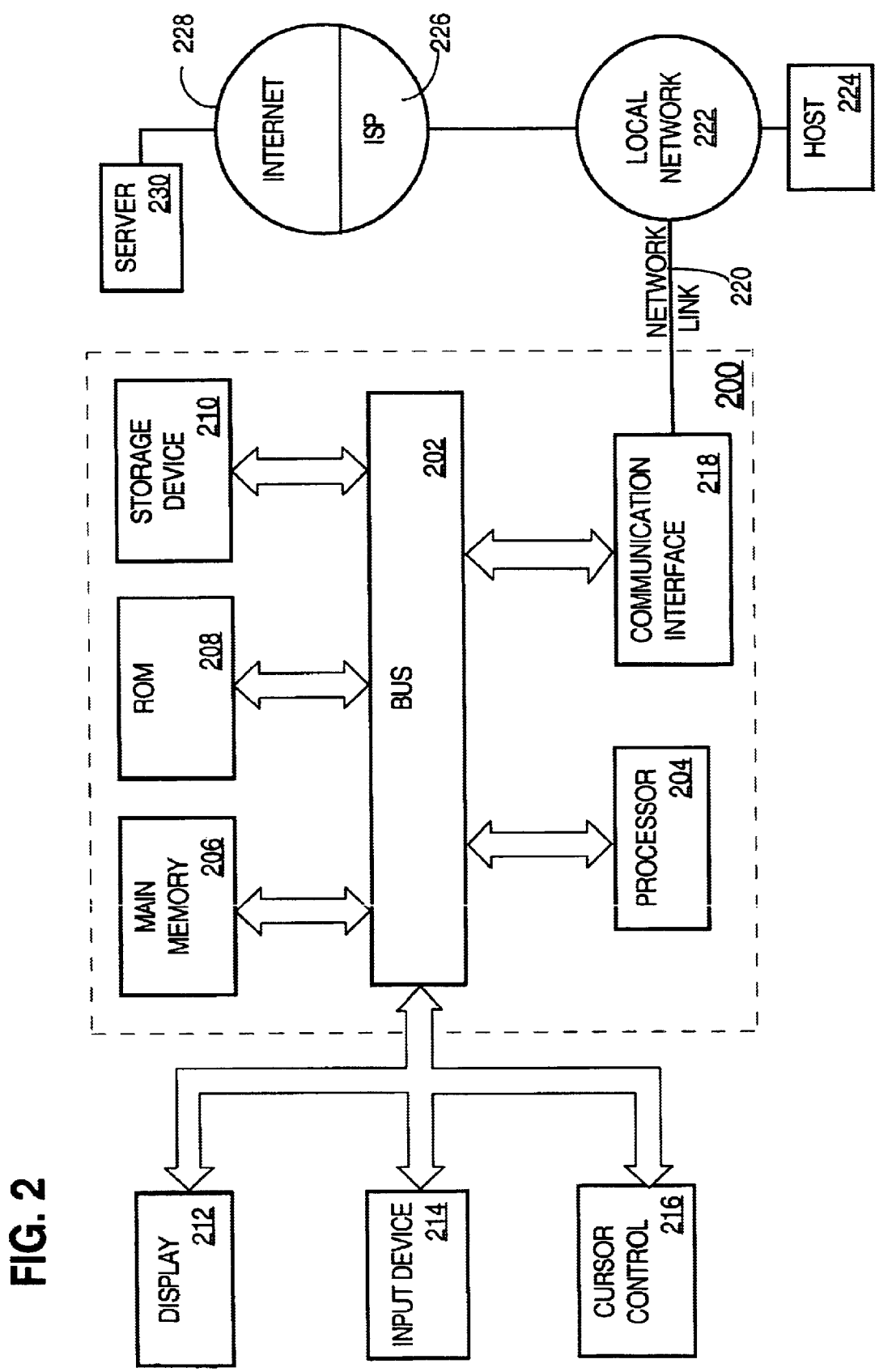
FIG. 2 is a block diagram depicting an exemplary computer system upon which an embodiment of the present invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are implemented by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for, execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application implements the techniques described herein.

The received code may be executed by processor 204 as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of indexing a body of records, the method comprising the steps of:

maintaining a set of records that each have a field that holds a value of a plurality values, wherein each value of said plurality of values falls within a range of a set of ranges, wherein each range from said set of ranges covers a subset of said plurality of values;

maintaining an index that associates each range of said set of ranges to those records in said set of records that have a value in said field that falls within said range; and wherein at least one entry in said index contains:
   first data that identifies a range of said set of ranges, and
   second data that identifies one or more records from said set of records that have a value in said field that falls within said range.

2. The method of claim 1, wherein
   the step of maintaining a set of records includes updating said field in a record in said set of records to a particular value that falls within a particular range; and
   the step of maintaining an index includes modifying said index to associate said particular row with said particular range in response to updating said record in said set of records.

3. The method of claim 1, wherein
   the step of maintaining a set of records includes creating a particular record with a particular value for said field;
   said particular value falls within a particular range; and
   the step of maintaining an index includes modifying said index to associate said particular value with said particular range in response to creating said particular record in said set of records.

4. The method of claim 1, wherein the step of maintaining an index includes maintaining a native index that associates each range of said set of ranges to records in said set of records having a value in said field that falls within said each range.

5. The method of claim 1, wherein the step of maintaining an index includes maintaining a bitmap index that includes an entry that maps a range from said set of ranges to a bitmap, wherein bit positions in said bitmap each corresponds to a record from said set of records.

6. A method for providing records that satisfy one or more criteria, the method comprising the steps of:

receiving a request to retrieve, from a body of records, a subset of records that satisfy one or more criteria,
   wherein each record from said body of records includes a field that holds a value of a plurality values, wherein each value of said plurality of values falls within- a range of a set of ranges;

wherein said one or more criteria include at least one criterion that said subset of records have a value for said field that falls within a specified range;

retrieving said subset of records using an index that associates each range of said set of ranges to records from said body of records that have a value that falls within said range for said field; and wherein at least one entry in said index contains:
   first data that identifies a range of said set of ranges, and
   second data that identifies one or more records from said set of records that have a value in said field that falls within said range.

7. The method of claim 6, wherein said specified range overlaps but does not exactly coincide with a particular range of said set of ranges.

8. The method of claim 6, further including the step of a database system maintaining said index.

9. The method of claim 6, wherein the step of using an index includes using a bitmap index with entries that associate said each range from said set of ranges to a bitmap, wherein bit positions in said bitmap each corresponds to a record from said set of records.

10. The method of claim 9, wherein the step of using a bitmap includes combining a bitmap from said bitmap index with another bitmap that indicates which records from said body of records satisfy another criterion that is different than said at least one criterion.

11. The method of claim 10, wherein said one or more criteria include said other criteria, and said other bitmap is from another bitmap index.

12. A computer-readable medium carrying one or more sequences of one or more instructions for indexing a body of records, the one or more sequences of one or more instructions including instructions which, when executed by one or more processors, cause the one or more processors to perform the steps of:

maintaining a set of records that each have a field that holds a value of a plurality values, wherein each value of said plurality of values falls within a range of a set of ranges, wherein each range from said set of ranges covers a subset of said plurality of values;

maintaining an index that associates each range of said set of ranges to those records in said set of records that have a value in said field that falls within said range; and wherein at least one entry in said index contains:
   first data that identifies a range of said set of ranges, and
   second data that identifies one or more records from said set of records that have a value in said field that falls within said range.

13. The computer-readable media of claim 12, wherein
   the step of maintaining a set of records includes updating said field in a record in said set of records to a particular value that falls within a particular range; and
   the step of maintaining an index includes modifying said index to associate said particular row with said particular range in response to updating said record in said set of records.

14. The computer-readable media of claim 13, wherein
   the step of maintaining a set of records includes creating a particular record with a particular value for said field;

said particular value falls within a particular range; and the step of maintaining an index includes modifying said index to associate said particular value with said particular range in response to creating said particular record in said set of records.

15. The computer-readable media of claim 13, wherein the step of maintaining an index includes maintaining a native index that associates each range of said set of ranges to records in said set of records having a value in said field that falls within said each range.

16. The computer-readable media of claim 13, wherein the step of maintaining an index includes maintaining a bitmap index that includes an entry that maps a range from said set of ranges to a bitmap, wherein bit positions in said bitmap each corresponds to a record from said set of records.

17. A computer-readable medium carrying one or more sequences of one or more instructions for indexing a body of records, the one or more sequences of one or more instructions including instructions which, when executed by one or more processors, cause the one or more processors to perform the steps of:

receiving a request to retrieve, from a body of records, a subset of records that satisfy one or more criteria, wherein each record from said body of records includes a field that holds a value of a plurality values, wherein each value of said plurality of values falls within a range of a set of ranges;

wherein said one or more criteria include at least one criterion that said subset of records have a value for said field that falls within a specified range;

retrieving said subset of records using an index that associates each range of said set of ranges to records from said body of records that have a value that falls within said range for said field; and wherein at least one entry in said index contains:

first data that identifies a range of said set of ranges, and second data that identifies one or more records from said set of records that have a value in said field that falls within said range.

18. The computer-readable media of claim 17, wherein said specified range overlaps but does not exactly coincide with a particular range of said set of ranges.

19. The computer-readable media of claim 17, further including the step of a database system maintaining said index.

20. The computer-readable media of claim 17, wherein the step of using an index includes using a bitmap index with entries that associate said each range from said set of ranges to a bitmap, wherein bit positions in said bitmap each corresponds to a record from said set of records.

* * * * *